Patented Aug. 12, 1947

2,425,341

UNITED STATES PATENT OFFICE 2,425,341

PRODUCTION OF MONO- AND UNSYMMETRICALLY DISUBSTITUTED GUANIDINES

Joseph H. Paden and Alexander F. MacLean, Stamford, Conn., assignors to American Cyanamid Company, New York, N. Y., a corporation of Maine No Drawing. Application August 11, 1944, Serial No. 549,124

9 Claims. (Cl. 260—564)

This invention relates to a new method of preparing mono- and unsymmetrically di-substituted guanidines. More particularly, the invention involves the preparation of substituted guanidines by the reaction of aqueous solutions of cyanamide and appropriate primary and secondary amines under conditions resulting in an exceptionally pure product and high yields.

Mono- and unsymmetrically di-substituted guanidines are known compounds and have been prepared by several different methods. Unfortunately, most of the previously-known methods of preparing these highly useful compounds are not entirely satisfactory for one or more of such reasons as low yields, impure product, excessive reaction time, or the like. We have discovered, however, that mono- and unsymmetrically di-substituted guanidines may be prepared by the new process to be described herein by us, in better yields, in less time, and in a higher degree of purity than heretofore thought possible.

In accordance with our new process mono- and unsymmetrically di-substituted guanidines are prepared by reacting cyanamide with acid salts of primary or secondary amines having dissociation constants of $1 \times 10^{-6}$ or greater in the presence of the corresponding free amine. Preferably the concentration of the cyanamide is kept low, at least during the early stage of the reaction, by adding the cyanamide in the form of an aqueous solution to the amine and the amine salt as the reaction progresses.

During the course of our experiments in preparing mono- and unsymmetrically di-substituted guanidines we discovered that the acid salts of those amines having dissociation constants of at least $1 \times 10^{-6}$ will not react at 100° C. with aqueous cyanamide if the reaction medium is neutral or acidic. At higher temperatures, 150° C., for example, some reaction does occur, but the yield of substituted guanidine is so low that the reaction is commercially impractical.

When attempts are made to react cyanamide with free primary or secondary amines under ordinary conditions only a small yield of a substituted guanidine is obtained. The product of the reaction is an extremely strong base and is unstable in the presence of water. Furthermore, the unreacted cyanamide tends to form dicyandiamide in the presence of strong bases and the resulting dicyandiamide is not easily converted to the desired substituted guanidine. Also, the cyanamide hydrolyzes to some extent to urea, carbon dioxide and ammonia. As a result, much of the cyanamide is converted to undesirable and contaminating products. It is evident, therefore, that the production of substituted guanidines by the reaction of the two reactants, cyanamide and free amine, is unsatisfactory from a commercial point of view.

We have found, however, that if aqueous solutions of cyanamide are caused to react with a primary or secondary amine in the presence of an acid salt of the same free amine, mono- and unsymmetrically di-substituted guanidine salts are formed in surprisingly high yields. Although we do not wish to be bound by any theoretical explanation, it appears that, under the conditions employed by us, the cyanamide first reacts with the free amine to yield a substituted guanidine. This guanidine is a stronger base than the amine from which it was derived and it reacts immediately with the acid salt-forming groups of the amine salt also present in the reaction mixture, thus resulting in the formation of more free amine, and the very stable acid salt of the unsymmetrically substituted guanidine. The reaction thus continues to completion. The following equations are illustrative:

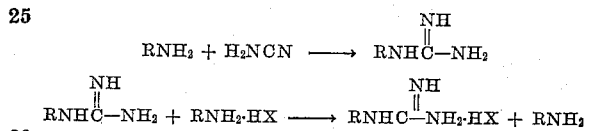

As will be apparent from the foregoing, our reaction mixture contains a primary or secondary amine having a dissociation constant of at least $1 \times 10^{-6}$ and an acid salt of the same amine. The relative proportions of the free amine base to the amine salt is not particularly critical. There should be, however, enough of the free amine base to raise the pH of the solution to 8 or above. As will be seen in the specific examples which follow, the best yields are obtained, in most cases, when the pH of the reaction mixture is about 9.5 to 11. The amount of free amine necessary to bring the pH within the preferred range will naturally vary with the strength of the amine. As a general rule, at least 0.05 mol of the free amine should be used with each mol of the amine salt to bring the pH of the reaction mixture within the more favorable operating conditions of the process.

On the other hand, the quantity of amine salt present in the reaction mixture should be sufficiently high to insure that most of the product will be in the form of a guanidine salt. If the reaction is carried out under such conditions that there are insufficient acid salt-forming groups in the reaction mixture to combine with the substituted guanidine formed therein, some of the disadvantages resulting from the presence of this unstable product in the reaction mixture will arise. Of course the upper limit of the amount of free amine will depend upon the particular conditions of the reaction. As a general rule, the molar quantity of free amine should not exceed the molar quantity of amine salt.

When reacting cyanamide with primary or secondary amines in the presence of amine salts under the conditions described, improved yields of substitute guanidine salts are obtained. Still better yields of these products are obtained, however, if the concentration of unreacted cyanamide in the reaction mixture is maintained at a minimum throughout the course of the reaction. It is desirable to keep the concentration of cyanamide low to prevent the formation of dicyandiamide and other undesirable products which tend to form under the conditions of the reaction.

A convenient way of maintaining a low concentration of cyanamide in the reaction mixture is to add the cyanamide in the form of an aqueous solution to the reaction mixture as the reaction progresses. The rate at which the cyanamide solution is added will depend, of course, upon the rate of the reaction between the added cyanamide and the amine. Naturally some amines react faster than others. Also at different temperatures and pH conditions the reaction proceeds at different rates. Under most conditions, however, the major proportion of the cyanamide will be added over a period of about from 10 minutes to 2 hours when the process is a batch operation.

When the process is conducted in a continuous manner, no fixed time for adding the cyanamide can be given. Under these conditions, however, it is best to add the cyanamide solution at a rate at which there is not more than about ¼ of a mol of unreacted cyanamide present in the reaction mixture for each mol of unreacted amine and amine salt taken together.

We do not intend to imply from the above that more cyanamide should never be used in our process. Cyanamide is relatively cheap whereas some amines are expensive. When operating with expensive amines it is naturally desirable to obtain the highest overall yield based upon the amine used. Under these conditions, therefore, it may be desirable to carry out the reaction as just described while keeping the concentration of free cyanamide low during the early stages of the reaction. The reaction may then be completed with high overall yields of substituted guanidine by adding an excess of cyanamide to the reaction mixture towards the end of the reaction, thus converting practically all of the unreacted amine and its salt to the corresponding guanidine.

As will appear from what has been said, the product of the reaction may be a mono- or unsymmetrically di-substituted guanidine salt of the acid corresponding to the acid of the amine salt. When primary amines are used, the product is a mono-substituted guanidine. When secondary amines are used, the product is an unsymmetrically di-substituted guanidine. For example, when monobutylamine nitrate is used as the amine salt, then the product formed is a monobutyl guanidine salt. When di-butyl amine is used, the product is unsymmetrical di-butyl guanidine salt, etc.

The product of the reaction is usually isolated as an acid salt, although for many purposes it is not necessary to isolate the product, the solution being used directly in further chemical reactions. To obtain the free substituted guanidine, the salt-forming group may be removed by mere neutralization with a suitable alkaline substance, such as lime, barium hydroxide, caustic soda, or the like. Some of the products, particularly the nitrate salts, crystallize easily and may be recovered from the reaction solution by fractional crystallization. Other substituted guanidine salts are highly water soluble, for example, methyl guanidine sulphate, and may be recovered by evaporation of the solution or by spray drying or other known means.

The cyanamide solutions employed by us are known items of commerce. Usually these cyanamide solutions are manufactured and sold as containing 20 to 25% of free cyanamide. However, solutions containing 5 to 80% of cyanamide can be prepared and successfully used by us in our new process.

The primary and secondary amines which can be used advantageously in our new process are those having a dissociation constant of at least $1 \times 10^{-6}$, such as: methylamine, dimethylamine, ethylamine, mono-N-butylamine, di-N-butylamine, piperidine, isoamylamine, benzylamine, phenylethylamine, N-ethylbenzylamine, octylamine, laurylamine, stearylamine, morpholine, cyclohexylamine, mono-ethanolamine, etc. These amines may be used in the form of any of their organic or inorganic acid salts, including the salts of such acids as sulphuric, nitric, hydrochloric, acetic, propionic, carbonic, carbamic, succinic, phthalic, and the like.

The temperature at which our reaction may be conducted may vary from about 80° C. to 170° C. The upper temperature limit is dependent upon the rate at which the product decomposes. Ordinarily best results are obtained within the range 140 to 160° C. Under these conditions, it is usually necessary to conduct the reaction under pressure. Because of the use of optimum conditions, however, made available by our process, it is possible to carry out the reaction and obtain good yields of substituted guanidines at atmospheric pressure at temperatures up to about 120° C. Naturally, at the lower temperatures, more time is required to complete the reaction, but even so, the reaction is completed in less time than would ordinarily be expected. Under most conditions, the reaction can be completed in about six hours.

Our invention will now be illustrated in greater detail by means of the following specific examples. These examples are intended to illustrate certain aspects of the invention and do not necessarily represent the optimum conditions. Obviously, each amine will react differently and maximum yields of substituted guanidine are obtained under different conditions of pH, time, temperature, concentration, and the like, within the limits set forth herein. These examples, taken with the foregoing description of our invention will enable those skilled in the art to produce mono- and unsymmetrically di-substituted guanidines with better results than heretofore obtainable with a minimum of experimentation. All parts are by weight unless otherwise designated.

EXAMPLE I 13 liters of water was placed in a 22-liter flask equipped with cooling coils and stirrer and placed in an ice bath. 7000 grams of concentrated sulfuric acid was added to the water and the solution cooled. Methylamine was then bubbled into the solution at such a rate that the temperature did not rise above 40–45° C. Sufficient excess methylamine was added to bring the pH up to 10. The total methylamine added was 9.9 pounds.

The methylamine sulfate solution was charged into an autoclave and heated up to 170° C. Upon reaching this temperature, 52 pounds of a 23.1% aqueous solution of cyanamide was pumped in over a period of two hours. Upon completion of the addition of the cyanamide solution, the autoclave was immediately discharged, the solution cooled, and a small amount of insoluble material filtered out.

The methyl guanidine sulfate solution was evaporated under a vacuum at 50–60° C., to a thick slurry and a first crop of crystals filtered out. The filtrate was then further evaporated and a second crop of crystals obtained and combined with the first. The product was then recrystallized from an 80% solution of methanol and dried.

EXAMPLE II

A series of experiments was conducted whereby monomethyl guanidine nitrate was prepared using pH conditions varying from 2.0 to 10.7. In these experiments 2½ mols of mono-methyl amine nitrate dissolved in 1500 cc. of water was charged into a 3000 cc. autoclave equipped with steam coils, stirrer, thermocouple well, pressure gauge and liquid inlet line leading below the liquid level in the charged autoclave. In one experiment the pH of the methyl amine nitrate solution was adjusted to 2.0 with nitric acid and 0.25 mol of pyridine nitrate was added as a buffering agent. In a second experiment nothing other than the methyl amine nitrate was added to the original charge. In the other experiments small amounts of excess free methyl amine were added to bring the pH of the solution up to the desired value.

After closing the autoclave, the contents were heated to 150° C. with continuous stirring for a period of 15 to 20 minutes. Thereupon 1½ mols of cyanamide in the form of a 22.3% aqueous solution was pumped into the autoclave over a period of 40 minutes while maintaining the temperature of the contents at 150° C. Upon completion of the pumping the reaction mixture was kept at 150° C. for five minutes and then rapidly cooled to room temperature over a period of 5 to 10 minutes. The reaction solutions were then diluted to known volume and a sample was analyzed for monomethyl guanidine nitrate. The results of this series of experiments are shown in the following table:

TABLE I

*Methyl guanidine nitrate*

| pH | | Excess Amine | Per cent Conversion |
|---|---|---|---|
| Initial | Final | | |
| | | Grams | |
| 2.0 | 6.3 | None | 15 |
| 5.5 | 8.1 | None | 47 |
| 9.6 | 9.6 | 6 | 76 |
| 10.0 | 10.1 | 12.8 | 78 |
| 10.4 | 10.4 | 25.5 | 74 |
| 10.7 | 10.7 | 55.3 | 69 |

As will be seen, greatly improved yields are obtained when the reaction mixture contains free amine in addition to the amine salt. Percent conversion is based upon the cyanamide used.

EXAMPLE III

A second series of experiments similar to that of Example II was conducted, using mono-N-butylamine as the free base and mono-N-butylamine nitrate as the acid salt. As before, one experiment was run with no excess of butylamine with an initial pH of 2.0, a second experiment with no excess butylamine, but having the normal pH of the solution. Other experiments were conducted using varying amounts of the free amine. The results of this series of experiments are shown in the following table:

TABLE II

*Mono-N-butyl guanidine nitrate*

| pH | | Excess Amine | Per cent Conversion |
|---|---|---|---|
| Initial | Final | | |
| | | Grams | |
| 2.0 | 6.2 | None | 12 |
| 5.5 | 8.1 | None | 34 |
| 9.4 | 9.3 | 14 | 72 |
| 9.7 | 9.9 | 25 | 83 |
| 9.8 | 9.9 | 30 | 85 |
| 10.1 | 10.3 | 60 | 84 |
| 10.6 | 10.8 | 260 | 81 |

This series of experiments also shows that very much improved yields of the mono-substituted guanidines are obtained when using the free amine with the acid salt of the amine.

In a similar experiment in which the concentration of the mono-N-butyl amine nitrate was twice as great, that is, five mols of the amine nitrate in 1500 cc. of liquor, a conversion of 89% was obtained when using 60 grams of free amine therewith.

EXAMPLE IV

To prepare unsymmetrically di-substituted guanidines, secondary amines are employed. Two and one half mols of di-N-butylamine nitrate and a small quantity of di-N-butylamine free base (enough to give a pH of 8.8 to 9.3) were dissolved in 1500 cc. of water, and the solution was charged into an autoclave and heated to 150° C. One and one half mols of aqueous 22.3% cyanamide was pumped in over a 40-minute period while keeping the temperature of the reaction at 150° C. The yield of di-N-butyl guanidine nitrate was then determined by analysis and found to be as high as 84%. These experiments showed that secondary amines react similarly to primary amines and that much better yields are obtained when using the free amine in conjunction with the amine salt.

EXAMPLE V

To illustrate the use of heterocyclic amines a series of experiments was run using piperidine nitrate with free piperidine. The solution charged into the autoclave contained 2½ mols of piperidine nitrate in 1500 cc. of water. Excess piperidine was added as shown in the table below. The temperature of the reaction was 150° C. and the time of adding 1½ mols of cyanamide was 40 minutes, all as in Example II. The results of this series of experiments are shown in the following table:

Table III
N,N-pentamethylene guanidine

| pH | | Excess Amine | Per cent Conversion |
|---|---|---|---|
| Initial | Final | | |
| | | Grams | |
| 2.0 | 6.2 | None | 25 |
| 3.5 | 7.4 | None | 55 |
| 9.4 | 9.2 | 8.8 | 83 |
| 9.8 | 9.9 | 20.0 | 87 |
| 9.9 | 10.0 | 30.0 | 91 |
| 10.0 | 10.2 | 37.6 | 95 |
| 10.4 | 10.6 | 75.2 | 90 |

EXAMPLE VI

Another series of experiments was made using methyl ammonium methyl carbamate with excess methyl amine. The methyl ammonium methyl carbamate was prepared by treating liquid methyl amine with solid carbon dioxide.

Two and a half mols of the product was dissolved in 1500 cc. of water and charged into an autoclave as in Example II. The contents were then heated to 150° C. and 1½ mols of 22.3% cyanamide solution was pumped into the reaction mixture over a period of 40 minutes while holding the temperature of the reaction mixture at 150° C. Several more experiments were run using 4 to 60 grams of excess methyl amine at a pH of from 10.1 to 11.0. In all cases, better results were obtained when using excess methyl amine free base with the amine salt.

Experiments were also run in which the initial autoclave charge contained 5 and 10 mols of methyl ammonium methyl carbamate in 1500 cc. of water. Yields as high as 84% of theoretical were obtained under the conditions employed. Even better yields are possible.

EXAMPLE VII 100 g. (1.00 mol) of butylamine hydrochloride and 7 g. (0.10 mol) of butylamine were dissolved in 63 g. of water and heated to 100° C. under atmospheric pressure. 283 g. of 23% cyanamide solution (1.55 mol) was added with stirring over 3 hrs. and 30 minutes. The reaction was heated 15 minutes longer and then cooled. The reaction product, monobutyl guanidine hydrochloride, was evaporated to a syrup, converted to the free base, and then to butylguanidine bicarbonate by treatment with carbon dioxide. 162 g. of butylguanidine bicarbonate was recovered. This corresponds to a 92% yield based on the butylamine hydrochloride used.

EXAMPLE VIII 84 g. (0.27 mol) of octadecyl amine hydrochloride and 3 g. (0.011 mol) octadecyl amine were dissolved in 20 cc. of water and just sufficient butyl alcohol to form a clear solution. The solution was boiled to 97° C. under atmospheric pressure and 82 g. of 23% cyanamide solution was added with stirring over 2 hrs. Occasional additions of butyl alcohol were made to keep the amine in solution. The reaction was heated 50 minutes after the addition was finished and then cooled. The reaction product was converted to octadecyl guanidine carbonate with sodium carbonate. 54 g. of octadecyl guanidine carbonate was obtained. This corresponds to a 61% yield based on the octadecylamine hydrochloride used.

We claim:

1. A method of preparing unsymmetrically substituted guanidines which comprises the step of adding an aqueous solution containing from 5% to 80% by weight of cyanamide to a mixture of an amine of the group consisting of primary and secondary amines having a dissociation constant of at least $1 \times 10^{-6}$ and an acid salt of said amine at a pH of at least 8 and at a temperature within the range of 80°–170° C., the rate of addition of said cyanamide solution being such that there is no more than about ¼ of a mol of unreacted cyanamide for each mol of unreacted amine and amine salt present therein during the early stages of the reaction.

2. A method of preparing unsymmetrically substituted guanidines which comprises the step of adding an aqueous solution containing 5 to 80% by weight of cyanamide to a mixture of an amine of the group consisting of primary and secondary amines having a dissociation constant of at least $1 \times 10^{-6}$ and an acid salt of said amine, the proportion of free amine present in the reaction mixture being from about 0.05 to 1.0 mol of free amine for each mol of amine salt, the pH of the reaction mixture being at least 8 and the temperature being within the range of at least 80°–170° C.

3. A method of preparing unsymmetrically substituted guanidines which comprises the steps of preparing an aqueous solution containing an acid salt of an amine of the group consisting of primary and secondary amines having a dissociation constant of at least $1 \times 10^{-6}$ and the corresponding free amine in proportions of one mole of the said acid salt to 0.05 to 1.0 moles of the said free amine enough free amine being present to give the solution a pH of at least 8 and adding thereto over a period of time of from about ten minutes to two hours an aqueous solution of cyanamide containing from 5% to 80% by weight of cyanamide and causing a reaction to occur whereby an unsymmetrically substituted guanidine salt is formed by maintaining the temperature of the reaction mixture between 80° C. and 170° C.

4. A method of preparing unsymmetrically substituted guanidines which comprises the steps of preparing an aqueous solution containing an acid salt of an amine of the group consisting of primary and secondary amines having a dissociation constant of at least $1 \times 10^{-6}$ and the corresponding free amine in proportions of one mole of the said acid salt to 0.05 to 1.0 mole of the said free amine enough free amine being present to give the solution a pH of at least 8 and adding thereto over a period of time of from about ten minutes to two hours an aqueous solution of cyanamide containing from 20% to 25% by weight of cyanamide and causing a reaction to occur whereby an unsymmetrically substituted guanidine salt is formed by maintaining the temperature of the reaction mixture between 140° and 160° C.

5. A method of preparing mono-substituted guanidines which comprises the steps of preparing an aqueous solution containing an acid salt of a primary amine having a dissociation constant of at least $1 \times 10^{-6}$ and the corresponding free amine in proportions of one mole of the said acid salt to 0.05 to 1.0 mole of the said free amine enough free amine being present to give the solution a pH of at least 8 and adding thereto over a period of time of from about ten minutes to two hours an aqueous solution of cyanamide containing from 5% to 80% by weight of cyanamide and causing a reaction to occur whereby an unsymmetrically substituted guanidine salt is formed by maintaining the temperature of the reaction mixture between 80° C. and 170° C.

6. A method of preparing mono-substituted guanidines which comprises the step of adding an aqueous solution containing from 5% to 80% by weight of cyanamide to an aqueous solution having a pH between 9.5 and 11 and comprising water, a primary amine having a dissociation constant of at least $1 \times 10^{-6}$ and an acid salt of said amine, the rate of addition of said cyanamide solution being such that there is no more than about ¼ mole of unreacted cyanamide for each mole of unreacted amine and amine salt present therein, the temperature of the reaction mixture being within the range 80° to 170° C.

7. A method of preparing unsymmetrically di-substituted guanidines which comprises the step of adding an aqueous solution containing from 5% to 80% by weight of cyanamide to an aqueous solution having a pH between 9.5 and 11 and comprising water, a secondary amine having a dissociation constant of at least $1 \times 10^{-6}$ and an acid salt of said amine, the rate of addition of said cyanamide solution being such that there is no more than about ¼ mole of unreacted cyanamide for each mole of unreacted amine and amine salt present therein, the temperature of the reaction mixture being within the range 80° to 170° C.

8. A method of preparing mono-octadecyl guanidine hydrochloride which comprises the step of adding an aqueous solution containing 5% to 80% by weight of cyanamide to an aqueous solution of mono-octadecylamine hydrochloride and mono-octadecyl amine, the proportion of free amine present in the reaction mixture being from about 0.05 to 1.0 mole of free amine for each mole of amine salt, the pH of the reaction mixture being at least 8 and the temperature within the range of at least 80° to 170° C.

9. A method of preparing unsymmetrically substituted guanidines which comprises the steps of adding an aqueous solution containing from 5% to 80% by weight of cyanamide to an aqueous solution having a pH of at least 8 and comprising water, an amine and an acid salt of the said amine, the amine being selected from the group consisting of primary and secondary amines having a dissociation constant of at least $1 \times 10^{-6}$, the rate of addition of said cyanamide solution being such that there is no more than about ¼ mole of unreacted cyanamide for each mole of unreacted amine and amine salt present therein, the temperature of the reaction mixture being within the range 80° to 170° C., and, after the reaction has been substantially completed, adding a molecular excess of the cyanamide solution to the reaction mixture.

JOSEPH H. PADEN.
ALEXANDER F. MacLEAN.

REFERENCES CITED

The following references are of record in the file of this patent:

UNITED STATES PATENTS

| Number | Name | Date |
|---|---|---|
| 1,795,738 | Schotte | Mar. 10, 1931 |
| 2,252,400 | Hill | Aug. 12, 1941 |

FOREIGN PATENTS

| Number | Country | Date |
|---|---|---|
| 494,918 | Germany | Mar. 31, 1930 |
| 506,282 | Germany | Sept. 1, 1930 |